(12) United States Patent
Masunaga et al.

(10) Patent No.: US 9,188,220 B2
(45) Date of Patent: Nov. 17, 2015

(54) GEAR SHIFT CONTROL APPARATUS FOR VEHICLE

(71) Applicants: Seiji Masunaga, Susono (JP); Yoshio Hasegawa, Chiryu (JP); Keisuke Ota, Susono (JP)

(72) Inventors: Seiji Masunaga, Susono (JP); Yoshio Hasegawa, Chiryu (JP); Keisuke Ota, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/433,959

(22) PCT Filed: Jan. 3, 2014

(86) PCT No.: PCT/IB2014/000191
§ 371 (c)(1),
(2) Date: Apr. 7, 2015

(87) PCT Pub. No.: WO2014/108802
PCT Pub. Date: Jul. 17, 2014

(65) Prior Publication Data
US 2015/0252891 A1 Sep. 10, 2015

(30) Foreign Application Priority Data
Jan. 8, 2013 (JP) .................. 2013-001204

(51) Int. Cl.
*F16H 61/04* (2006.01)
*F16H 61/02* (2006.01)
*F16H 61/686* (2006.01)
*F16H 61/00* (2006.01)

(52) U.S. Cl.
CPC ........ *F16H 61/0437* (2013.01); *F16H 61/0213* (2013.01); *F16H 61/686* (2013.01); *F16H 2061/0093* (2013.01)

(58) Field of Classification Search
None
See application file for complete search history.

(56) References Cited

U.S. PATENT DOCUMENTS

| | | | |
|---|---|---|---|
| 6,754,574 B2* | 6/2004 | Tokura ................. | B60W 10/06 180/176 |
| 7,500,932 B2* | 3/2009 | Katakura ............. | F16H 61/061 475/123 |
| 7,912,614 B2* | 3/2011 | Honma ............... | F16H 61/0437 477/34 |

FOREIGN PATENT DOCUMENTS

| | | |
|---|---|---|
| JP | 2000-097325 A | 4/2000 |
| WO | 2014/020685 A1 | 2/2014 |

* cited by examiner

*Primary Examiner* — Erin D Bishop
(74) *Attorney, Agent, or Firm* — Oliff PLC

(57) ABSTRACT

In a gear shift control apparatus for a vehicle, since a torque sharing rate is set as a constraint for a motion equation for an automatic transmission, suitable control in torque delivery, which is considered difficult in gear shift control, can be implemented and also the motion equation can be solved. Furthermore, when at least four control operation amounts must be determined in order to achieve two gear shift target values, another engaging device is classified into any of an engaging-side clutch and a releasing-side clutch depending on how another clutch torque acts on progress of a gear shift, hence in addition to achieving torque sharing in accordance with a torque sharing rate between the engaging-side clutch and the releasing-side clutch, torque sharing among a plurality of engaging devices classified into a same side can be arbitrarily set. As a result, the respective control operation amounts can be determined.

6 Claims, 8 Drawing Sheets

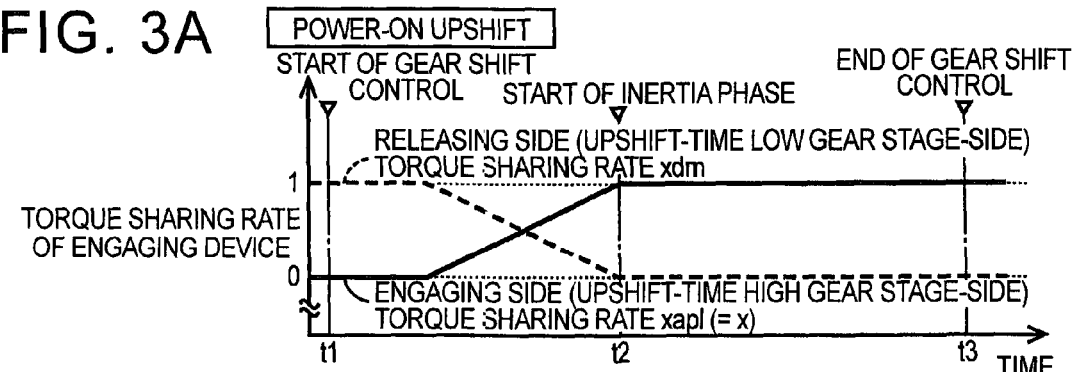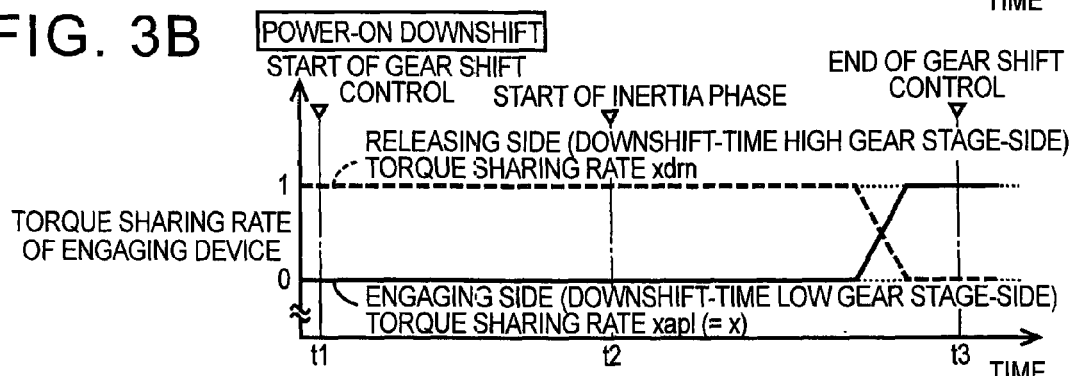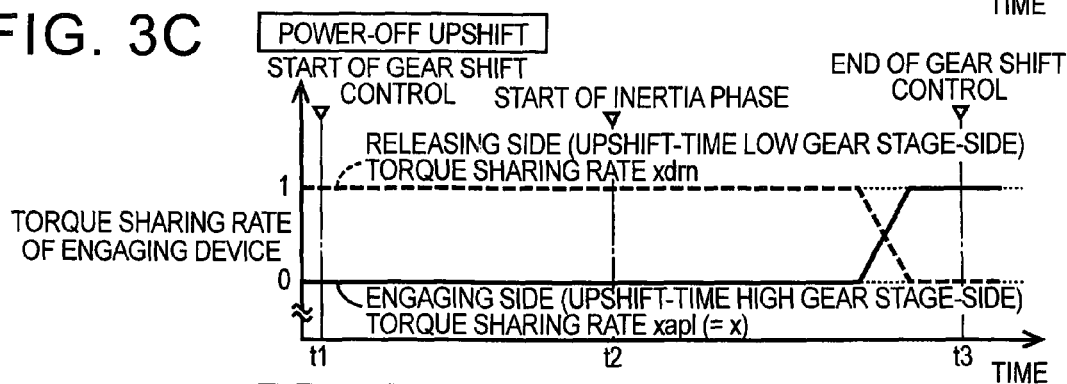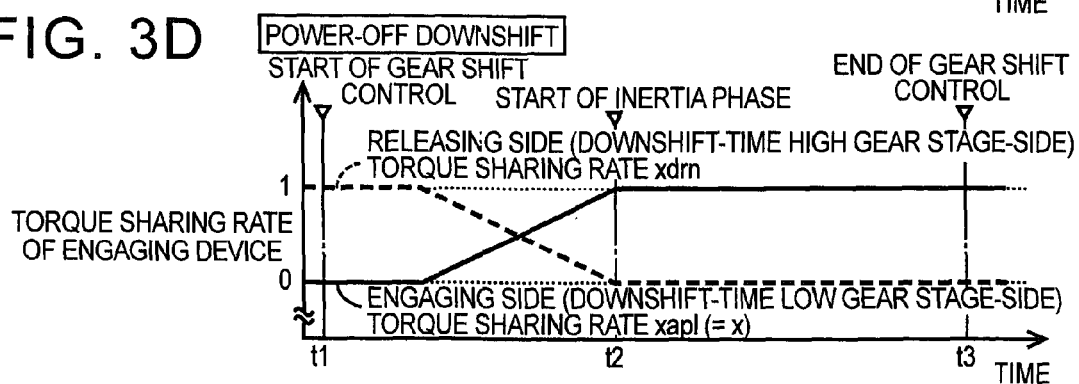

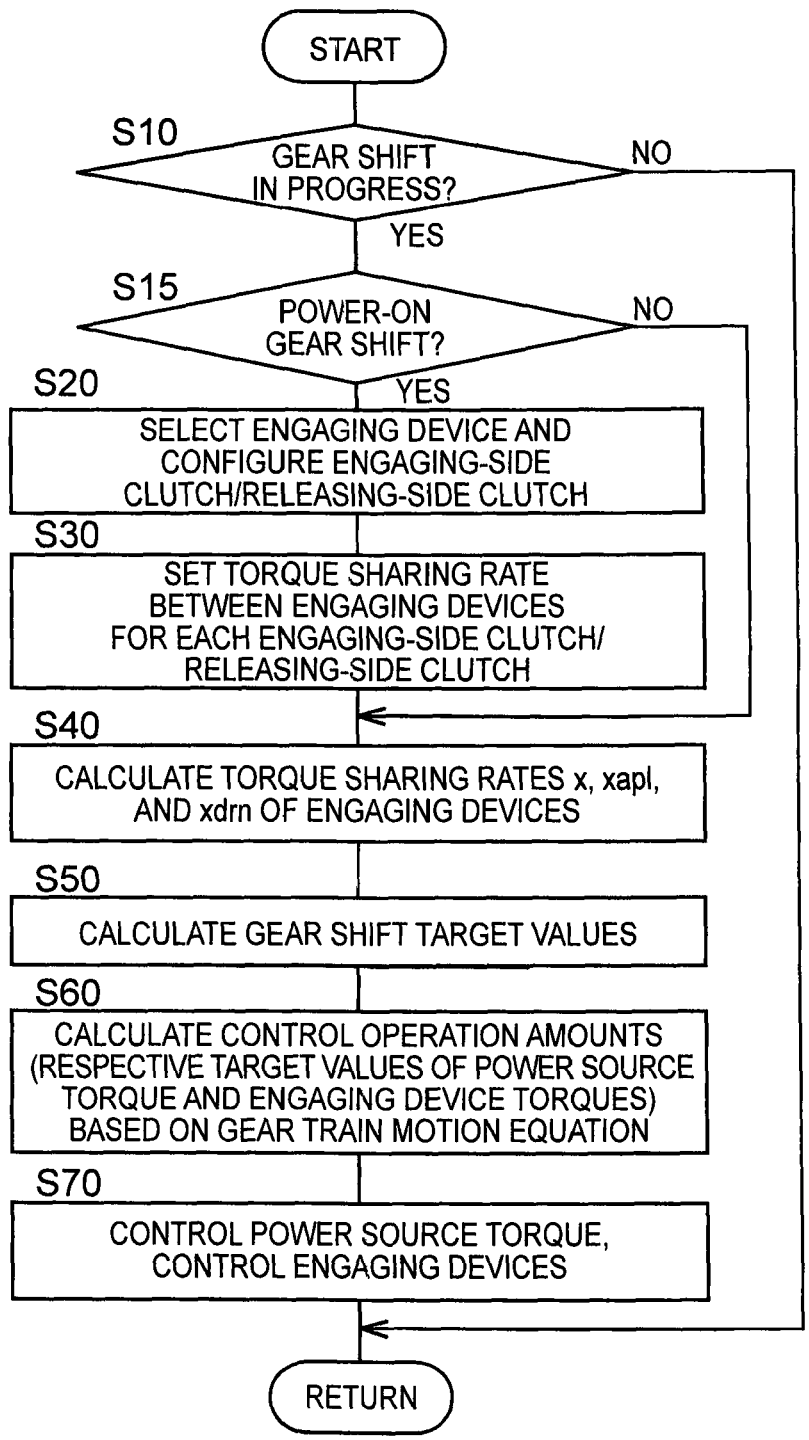

GEAR SHIFT CONTROL APPARATUS FOR VEHICLE

BACKGROUND OF THE INVENTION

1. Field of the Invention

This invention relates to a gear shift control apparatus of a vehicle that executes gear shift control of an automatic transmission and, in particular, relates to a technique for executing a gear shift of the automatic transmission using a gear shift model.

2. Description of Related Art

Automatic transmissions having a plurality of engaging devices which transmit rotation and torque between an input shaft that receives power from a drive power source and an output shaft that transmits the power to a drive wheel and executing a gear shift by switching between engagement and release of the engaging devices are widely available. Generally, with such an automatic transmission, adaptation of a demanded value (in other words, a control operation amount) of an operated element (for example, torque) is performed on a control object for each gear stage while performing evaluation on an actual vehicle, and a gear shift is executed based on the adaptation result using a control operation amount determined from a control map obtained in advance for each gear stage. However, as the number of shift stages in automatic transmissions increase, significantly greater effort is required by such adaptation work and, as a result, it is becoming difficult to adopt modes of gear shift control that are based on a control map. Therefore, gear shift model control that is a mode of gear shift control based on a motion equation of each rotating element constituting an automatic transmission is proposed. With such gear shift model control, a control operation amount is uniquely determined by solving a motion equation obtained in advance based on a variation mode (a gear shift target value) that is desirably achieved as a result of a gear shift and the determined control operation amount is used to execute a gear shift. For example, Japanese Patent Application Publication No. 2000-97325 (JP 2000-97325 A) describes, with respect to inertia phase control, a technique for executing a gear shift by setting a target value of an input shaft rotation speed of a transmission as a gear shift target value and calculating a demanded value of an engaging-side clutch torque as a control operation amount, and a technique for executing a gear shift by setting respective target values of an input shaft rotation speed and an output shaft torque of a transmission as gear shift target values and calculating a demanded value of an engaging-side clutch torque and a demanded value of a releasing-side clutch torque as control operation amounts using a gear shift model.

With the techniques described in JP 2000-97325 A, a gear shift is executed by either operating one control object with respect to one gear shift target value or operating two control objects with respect to two gear shift target values. However, with the techniques described in JP 2000-97325 A, since hydraulic pressure of a releasing-side engaging device is reduced towards release and subsequently temporarily increased once again toward engagement in order to cancel an inertia torque in an inertia phase (in other words, in order to prevent an output shaft torque in an inertia phase from substantially varying), there is a possibility that gear shift completion may be delayed and that drivability may decline. Meanwhile, there is a conventional method of so-called engine torque down control in which engine torque is temporarily reduced in an inertia phase in order to cancel the inertia torque. However, with the technique described in JP 2000-97325 A, the engine is not incorporated into the motion equation as a control object. In other words, with the technique described in JP 2000-97325 A, since the motion equation is solved with respect to a random engine torque, the gear shift model control described in JP 2000-97325 A is incapable of canceling an inertia torque by engine torque down control in place of temporarily increasing hydraulic pressure at the releasing-side engaging device. In this case, while engine torque down control can be executed separate from gear shift model control, such a procedure causes the entire gear shift model control to collapse and requires a solution to be once again derived from the motion equation, and may end up delaying gear shift completion or increasing gear shift shock which may cause a decline in drivability. On the other hand, attempting to uniquely determine an engine torque as a control operation amount by gear shift model control produces three control operation amounts with respect to two gear shift target values. As a result, the motion equation cannot be solved and a gear shift of the automatic transmission using gear shift model control can no longer be executed.

Problems such as those described above are not conventional, and no proposals have been made so far regarding appropriately setting a constraint for solving a motion equation when there are three control operation amounts with respect to two gear shift target values so as to enable a prescribed gear shift model to accommodate all gear shift patterns (gear shift modes) including power-on upshift, power-off upshift, power-on downshift, and power-off downshift. In contrast, this invention proposes a new technique for appropriately setting a constraint to solve a motion equation (refer to international application previously filed by the applicant but yet to be published at this time (International Application No.: PCT/JP2012/069408)). In addition, this invention proposes a technique which is based on, and further improves, the new technique described above.

SUMMARY OF THE INVENTION

The invention has been made in consideration of the circumstances above and provides a gear shift control apparatus for a vehicle capable of executing a desired gear shift of an automatic transmission using a gear shift model even if there are three control operation amounts with respect to two gear shift target values.

An aspect of the invention provides a gear shift control apparatus for a vehicle including a plurality of engaging devices and a controller. The plurality of engaging devices are configured to transmit rotation and torque between an input shaft that receives power from a drive power source and an output shaft that transmits the power to a drive wheel. The controller, in an automatic transmission provided in the vehicle, is configured to execute a gear shift by switching between engagement and release of the engaging devices and to execute a gear shift of the automatic transmission using a predetermined gear shift model, the predetermined gear shift model determining a control operation amount for achieving a gear shift target value. In addition, the controller is configured to set the gear shift target value using two values which are a torque on a rotating member on the output shaft side and a velocity variation of a rotating member on the input shaft side. Furthermore, the controller is configured to set the control operation amount using three values which are a torque on a rotating member on the input shaft side, a torque capacity of an engaging-side engaging device during the gear shift, and a torque capacity of a releasing-side engaging device during the gear shift. In addition, the controller is configured to set a torque sharing rate of a transmission torque that is shared between the engaging-side engaging device and the releasing-side engaging device during the gear shift. Furthermore, the controller is configured to execute a gear shift of the automatic transmission using the gear shift model. In addition, when generating a torque capacity during a gear shift of the automatic transmission at another engaging device which differs from engaging devices that form gear stages before and after the gear shift, the controller is configured to determine the control operation amount by including the torque capacity of the other engaging device in a torque capacity of the engaging-side engaging device in a case where the torque capacity of the other engaging device acts so as to promote progress of the gear shift, and the controller is configured to determine the control operation amount by including the torque capacity of the other engaging device in a torque capacity of the releasing-side engaging device in a case where the torque capacity of the other engaging device acts so as to impede progress of the gear shift. The torque sharing rate is a torque sharing rate of a transmission torque that is shared between the engaging-side engaging device and the releasing-side engaging device during the gear shift when the transmission torque shared between both engaging devices is replaced with a torque on a rotating member on the input shaft side.

According to the gear shift control apparatus of the vehicle described above, when three control operation amounts must be determined to achieve two gear shift target values, since a torque sharing rate of a transmission torque that is shared between the releasing-side engaging device and the engaging-side engaging device is set as a constraint in consideration of the fact that the control operation amounts cannot be determined unless some kind of constraint is set, the gear shift control apparatus of the vehicle is suitable for controlling delivery of a torque between the releasing-side engaging device and the engaging-side engaging device (in other words, a gear shift progress) that is considered difficult in gear shift control and the three control operation amounts can be determined. From another perspective, when any control operation amount is set to a prescribed value determined in advance in order to determine three control operation amounts, there are an infinite number of the prescribed value including a value conforming to each gear shift pattern. In contrast, with the gear shift control apparatus for a vehicle described above, since the torque sharing rate expressing delivery of a torque is set as a constraint, any gear shift pattern can be accommodated by a prescribed gear shift model. Specifically, when only one of the torque capacity of the engaging-side engaging device and the torque capacity of the releasing-side engaging device is set as a constraint, a tie-up or a blow-up of a rotating member may possibly occur. However, with the gear shift control apparatus for a vehicle described above, an occurrence of the tip-up or the blow-up can be suppressed by setting the torque sharing rate suitable for controlling gear shift progress as a constraint. In addition, conversely, controllability of control for intentionally generating a tie-up or a blow-up can be improved. Furthermore, setting a torque on the input shaft-side rotating member as a constraint may possibly prevent control for temporarily varying an output torque of the drive power source from being executed. However, with the gear shift control apparatus for a vehicle described above, for example, torque down control that temporarily reduces the output torque of the drive power source during an inertia phase can be suitably executed. As shown, according to the gear shift control apparatus for a vehicle described above, even if there are three control operation amounts with respect to two gear shift target values, the three control operation amounts can be appropriately determined using a gear shift model and a desired gear shift of the automatic transmission that achieves the two gear shift target values can be executed.

Depending on a gear shift of an automatic transmission, a torque capacity is conceivably generated on another engaging device which differs from engaging devices that form gear stages before and after a gear shift. As a result, at least four control operation amounts including a torque on an input shaft-side rotating member, a torque capacity of an engaging-side engaging device, a torque capacity of a releasing-side engaging device, and a torque capacity of the other engaging device are created, and simply adding the torque sharing rate as a constraint cannot solve the motion equation and a desired gear shift of the automatic transmission cannot be executed using a gear shift model. In consideration of such problems, when at least four control operation amounts must be determined in order to achieve two gear shift target values, since the gear shift control apparatus for a vehicle described above further classifies the other engaging-side into any of an engaging-side engaging device and a releasing-side engaging device depending on how the torque capacity of the other engaging device acts on progress of the gear shift, in addition to achieving torque sharing in accordance with the torque sharing rate between the engaging-side engaging device and the releasing-side engaging device, torque sharing among a plurality of engaging devices classified into a same side can be arbitrarily set. As a result, the respective control operation amounts can be determined. Therefore, with the gear shift control apparatus for a vehicle, a desired gear shift of the automatic transmission can be more appropriately executed using a gear shift model.

In the gear shift control apparatus for a vehicle described above, the controller may be configured to set a torque sharing rate of a torque capacity of each engaging device included in devices on a side including the torque capacity of the other engaging device. Accordingly, torque sharing among a plurality of engaging devices classified on the same side can be appropriately achieved.

In addition, in the gear shift control apparatus for a vehicle described above, the controller may be configured to set a torque sharing rate of a torque capacity of each of the engaging devices based on heat absorption amount by the engaging devices. Accordingly, torque sharing based on respective heat absorption amount can be appropriately achieved among a plurality of engaging devices classified on the same side. As a result, heat absorption amount can be set to or below a permissible value for each of the plurality of engaging devices classified on the same side.

Furthermore, in the gear shift control apparatus for a vehicle described above, the controller may be configured to prevent a torque capacity from being generated at the other engaging device whose torque capacity acts on a side that promotes progress of the gear shift when heat absorption amount of the engaging-side engaging device does not exceed a prescribed permissible value during the gear shift, and the controller may be configured to prevent a torque capacity from being generated at the other engaging device whose torque capacity acts on a side that impedes progress of the gear shift when heat absorption amount of the releasing-side engaging device does not exceed a prescribed permissible value during the gear shift. Accordingly, since unnecessary torque delivery of the engaging devices can be reduced, generation of a gear shift shock can be suppressed.

In addition, in the gear shift control apparatus for a vehicle described above, the controller may be configured to prevent a torque capacity from being generated at the other engaging device during a gear shift of the automatic transmission in which a torque on the input shaft-side rotating member is smaller than a prescribed torque. Accordingly, since unnecessary torque delivery of the engaging devices can be reduced, generation of a gear shift shock can be suppressed.

Furthermore, in the gear shift control apparatus for a vehicle described above, the controller may be configured to calculate the control operation amounts based on the gear shift target values, using a motion equation of the automatic transmission including the gear shift target values and the control operation amounts and using a relationships expressing the torque sharing rates in the gear shift model. Accordingly, since control related to torque delivery between the releasing-side engaging device and the engaging-side engaging device, the control being considered difficult in gear shift control, can be reflected in a motion equation, the three control operation amounts can be appropriately determined.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a diagram showing an example of timings where a torque sharing rate is varied which are determined in advance for each gear shift pattern in the case of a power-on upshift;

FIG. 3B is a diagram showing an example of timings where a torque sharing rate is varied which are determined in advance for each gear shift pattern in the case of a power-on downshift;

FIG. 3C is a diagram showing an example of timings where a torque sharing rate is varied which are determined in advance for each gear shift pattern in the case of a power-off upshift;

FIG. 3D is a diagram showing an example of timings where a torque sharing rate is varied which are determined in advance for each gear shift pattern in the case of a power-off downshift;

FIG. 8 is a flow chart showing a third embodiment for illustrating a substantial part of a control actuation of an electronic control unit or, in other words, a control actuation for even more appropriately executing a desired gear shift of an automatic transmission using a gear shift model even if another clutch torque is generated during the gear shift.

DETAILED DESCRIPTION OF EMBODIMENTS

In the invention, for example, the vehicle transmits power of the drive power source to the drive wheel via a power transmission device such as the automatic transmission. In addition, the automatic transmission is a stepped automatic transmission in which a plurality of shift stages (gear stages) respectively having different speed ratios (gear ratios) are alternatively formed by switching between engagement and release of prescribed engaging devices. For example, the stepped automatic transmission is constituted by a conventional planetary gear-type automatic transmission. As an engaging device in the planetary gear-type automatic transmission, engaging devices such as a multi-plate or single-plate clutch or brake which are engaged by a hydraulic actuator and a band brake are widely used. In addition, for example, the vehicle includes a hydraulic control circuit that respectively supplies hydraulic pressure to hydraulic actuators of a plurality of engaging devices. For example, the hydraulic control circuit includes a linear solenoid valve, an ON-OFF solenoid valve, and the like, and respectively supplies output hydraulic pressure of the solenoid valves to the hydraulic actuators of the engaging devices either directly or indirectly via a shift control valve or the like. The phrase "supplies hydraulic pressure" used above means "applying hydraulic pressure" or "supplying hydraulic oil controlled to certain hydraulic pressure".

Furthermore, for example, an engine such as a gasoline engine or a diesel engine is used as the drive power source. Alternatively, for example, a motor such as an electric motor is used independently or in combination with the engine as the drive power source.

Hereinafter, embodiments of the invention will be described in detail with reference to the drawings.

Figure 1:
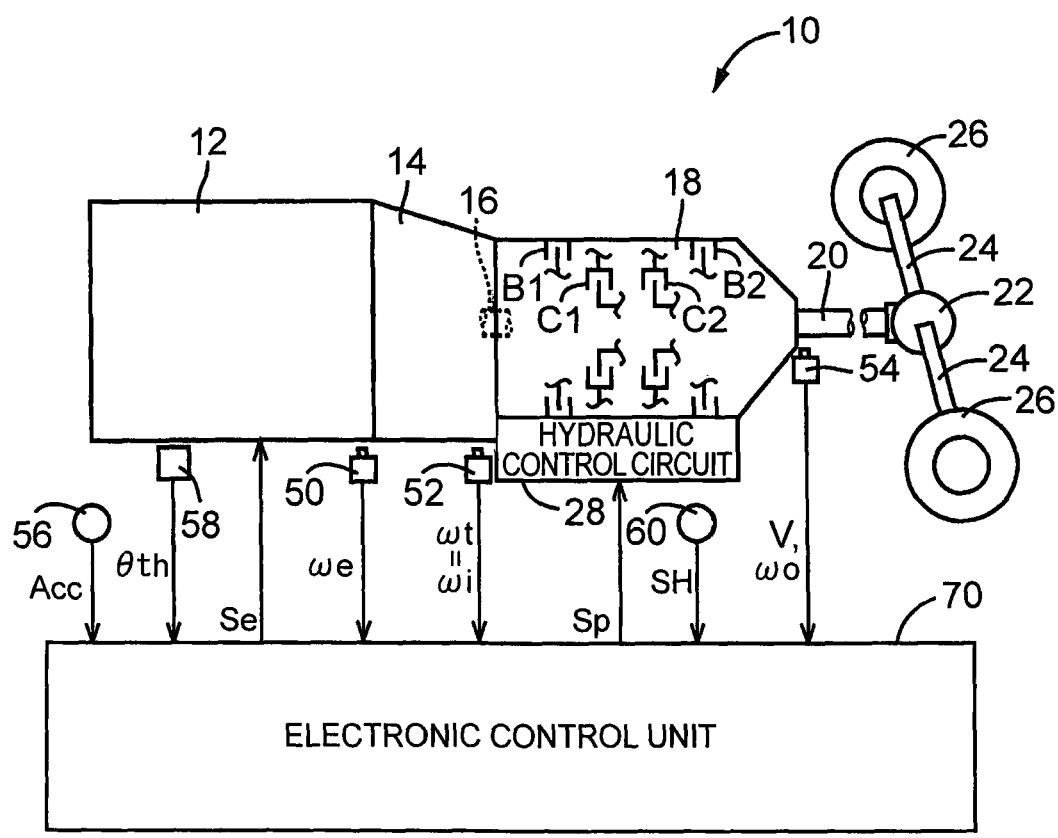
FIG. 1 is a diagram illustrating a schematic configuration of a power transmission path in a vehicle to which an embodiment of the invention is applied and also illustrating a substantial part of a control system provided in the vehicle.

FIG. 1 is a diagram illustrating a schematic configuration of a power transmission path from an engine 12 to a drive wheel 26 provided in a vehicle 10 to which a first embodiment of the invention is applied and also illustrating a substantial part of a control system provided in the vehicle 10. In FIG. 1, power generated by the engine 12 as a drive power source is inputted from an input shaft 16 to an automatic transmission 18 via a torque converter 14 and is transmitted from an output shaft 20 of the automatic transmission 18 to left and right drive wheels 26 sequentially via a differential gear device (differential gear) 22, a pair of axles (drive shafts) 24, and the like.

The automatic transmission 18 is a conventional planetary gear-type automatic transmission which includes one set or a plurality of sets of planetary gear devices and a plurality of engaging devices (engaging elements) in a transmission case as a non-rotating member attached to a vehicle body and in which a plurality of gear stages are alternatively established by the engaging devices. For example, the automatic transmission 18 is a stepped transmission which performs a so-called clutch-to-clutch gear shift in which a gear shift is executed by clutch-switching of any of a plurality of engaging devices (in other words, by switching between engagement and release of an engaging device). Each of the plurality of engaging devices is a hydraulic frictional engaging device which transmits rotation and torque between the input shaft 16 that receives power from the engine 12 and the output shaft 20 that transmits the power to the drive wheels 26. The input shaft 16 doubles as an input shaft of the automatic transmission 18 and a turbine shaft that is rotationally driven by a turbine wheel of the torque converter 14.

The hydraulic frictional engaging devices are clutches or brakes whose engagement and release are respectively controlled by the hydraulic control circuit 28 and whose torque capacity or, in other words, engaging force is varied by regulating pressure of a solenoid valve or the like in the hydraulic control circuit 28 to selectively couple members on both sides of the hydraulic frictional engaging device between which the hydraulic frictional engaging device is inserted. In this case, a torque capacity of an engaging device (hereinafter, referred to as a clutch torque) is determined by, for example, a friction coefficient of a friction material of the engaging device or engaging hydraulic pressure that presses against a friction plate. In order to transmit a torque between the input shaft 16 and the output shaft 20 (for example, a transmission input torque Ti that is inputted to the input shaft 16 or, in other words, a turbine torque Tt) without causing slipping of an engaging device (in other words, without generating a differential rotation speed in the engaging device), a torque capacity is required which produces an amount of transmission torque that must be shared by each engaging device (in other words, a shared torque of the engaging device) with respect to the torque to be transmitted. However, with a torque capacity that produces a transmission torque amount, the transmission torque does not increase even when the torque capacity is increased. Moreover, in the first embodiment, a clutch torque and engaging hydraulic pressure are sometimes used synonymously for the sake of convenience.

Examples of gear stages in the automatic transmission 18 include a low speed-side gear stage (a low gear stage such as a second speed gear stage) that is established by an engagement of a clutch C1 and a brake B1 and a high speed-side gear stage (a high gear stage such as a third speed gear stage) that is established by an engagement of the clutch C1 and a brake B2. Therefore, during a gear shift between the low gear stage and the high gear stage, clutch-switching is performed between the brake B1 and the brake B2. In the first embodiment, among the engaging devices that are clutch-switched during a gear shift, an engaging device involved in establishing a low gear stage (for example, the brake B1) will be referred to as a low gear stage engaging device, and an engaging device involved in establishing a high gear stage (for example, the brake B2) will be referred to as a high gear stage engaging device. A low gear stage engaging device becomes a releasing-side engaging device (hereinafter, referred to as a releasing-side clutch) during an upshift from a low gear stage to a high gear stage and becomes an engaging-side engaging device (hereinafter, referred to as an engaging-side clutch) during a downshift from a high gear stage to a low gear stage. On the other hand, a high gear stage engaging device becomes an engaging-side clutch during the upshift and a releasing-side clutch during the downshift. As an example of a gear stage other than those described above, a gear stage on a higher speed-side of the third speed gear stage (for example, a fifth speed gear stage) is established by an engagement of the clutch C1 and a clutch C2. During a gear shift between the second speed gear stage and the fifth speed gear stage, the second speed gear stage becomes a low gear stage, the fifth speed gear stage becomes a high gear stage, and the third gear stage becomes an intermediate gear stage.

Returning to FIG. 1, for example, the vehicle 10 is provided with an electronic control unit 70 that includes a gear shift control apparatus related to gear shift control of the automatic transmission 18 or the like. The electronic control unit 70 is configured to include, for example, a so-called microcomputer provided with a central processing unit (CPU), a random access memory (RAM), a read only (ROM), an input/output interface, and the like, and the CPU executes various types of control of the vehicle by performing signal processing according to a program stored in the ROM in advance while using a temporary storage function of the RAM. For example, the electronic control unit 70 is configured to execute output control of the engine 12, gear shift control of the automatic transmission 18, and the like and is separated into components for engine control, hydraulic control (gear shift control), and the like when necessary. In addition, the electronic control unit 70 is respectively supplied with various signals such as an engine rotation speed $\omega e$ that represents a rotation speed of the engine 12, a turbine rotation speed $\omega t$ that represents a rotation speed of the input shaft 16 or, in other words, a transmission input rotation speed $\omega i$, a transmission output rotation speed $\omega o$ that represents a rotation speed of the output shaft 20 corresponding to a vehicle speed V, an accelerator depression amount Acc that represents a demand of a driver with respect to a drive force (drive torque) of the vehicle 10, a throttle valve opening amount $\theta th$, and a shift operation SH performed by a shift lever or a paddle switch which are detected by various sensors including respective rotation speed sensors 50, 52, and 54, an accelerator depression amount sensor 56, a throttle valve opening amount sensor 58, and a shift sensor 60. Furthermore, an engine output control command signal Se for output control of the engine 12, a hydraulic pressure command signal Sp for actuating the hydraulic control circuit 28 that controls the hydraulic actuators of the automatic transmission 18, and the like are respectively outputted from the electronic control unit 70.

Figure 2:
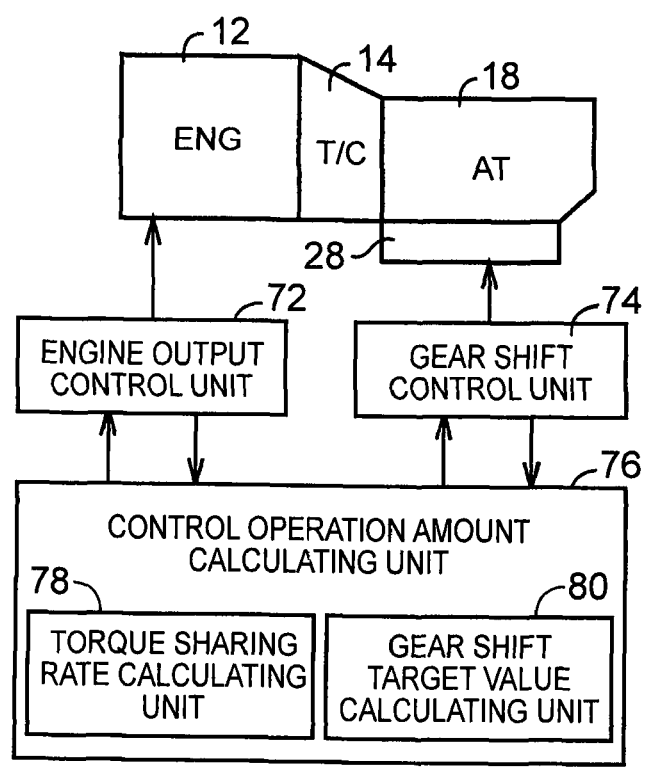
FIG. 2 is a functional block diagram illustrating a substantial part of a control function of an electronic control unit related to an engine and the power transmission path shown in FIG. 1.

FIG. 2 is a functional block diagram illustrating a substantial part of a control function provided by the electronic control unit 70. In FIG. 2, for example, an engine output control unit 72 outputs an engine output control command signal Se which controls opening and closing of an electronic throttle valve using a throttle actuator for throttle control, controls a fuel injection amount of an fuel injection device for fuel injection amount control, and controls an ignition device such as an igniter for ignition timing control so that an engine torque Te that is demanded (hereinafter, a demanded engine torque Tedem) is obtained. For example, using the accelerator depression amount Acc as a parameter, the engine output control unit 72 calculates a demanded drive force Fdem based on an actual accelerator depression amount Acc and a vehicle speed V from a relationship (a drive force map, not shown) stored in advance between the vehicle speed V and the demanded drive force Fdem. In addition, for example, the engine output control unit 72 calculates the demanded engine torque Tedem that produces the demanded drive force Fdem based on an effective tire radius of the drive wheels 26, a gear ratio of a gear stage of the automatic transmission 18, a final deceleration ratio in the power transmission path that is closer to the drive wheels 26 than the output shaft 20, and a torque ratio t of the torque converter 14. Moreover, the torque ratio t of the torque converter 14 is calculated based on an actual speed ratio e from an already available relationship (an actuation characteristic diagram of the torque converter 14) which is stored in advance among a speed ratio (=turbine rotation speed $\omega t$/pump rotation speed $\omega p$ (engine rotation speed $\omega e$)), the torque ratio t, efficiency, and a capacity coefficient.

A gear shift control unit 74 executes gear shift control of the automatic transmission 18. Specifically, using the vehicle speed V and the accelerator depression amount Acc as variables, the gear shift control unit 74 makes a gear shift determination based on a vehicle state expressed by an actual vehicle speed V and an actual accelerator depression amount Acc from an already available relationship (a gear shift map, a gear shift diagram) which is stored in advance. In addition, when the gear shift control unit 74 determines that a gear shift of the automatic transmission 18 is to be performed, the gear shift control unit 74 executes automatic gear shift control of the automatic transmission 18 so that a desired gear stage is obtained. For example, the gear shift control unit 74 outputs a hydraulic pressure command signal Sp that causes an engaging device involved in a gear shift of the automatic transmission 18 to be engaged and/or released to the hydraulic control circuit 28 so that the determined gear state is achieved. Examples of the hydraulic pressure command signal Sp include a hydraulic pressure command value for obtaining a torque capacity of a releasing-side clutch (hereinafter, referred to as a releasing-side clutch torque) and a hydraulic pressure command value for obtaining a torque capacity of an engaging-side clutch (hereinafter, referred to as an engaging-side clutch torque).

Methods of gear shift control include, for example, determining a torque capacity (or a hydraulic pressure command value) during a gear shift from a control map determined in advance by adaptation while evaluating whether or not a gear shift shock, a gear shift time, or the like is appropriate on an actual vehicle and executing a gear shift of the automatic transmission 18. With a method using a control map such as described above, different control maps must be created depending on what type of gear shift is to be used for the gear shift. Therefore, the larger the number of gear stages in the automatic transmission 18, the greater the effort that is required by the adaptation work described above. Examples of the types of gear shift described above include various gear shift modes expressed by combinations of various gear shift patterns (gear shift modes) such as a power-on upshift, a power-off upshift, a power-on downshift, and a power-off downshift, and various gear interstages such as first speed-second speed. More specifically, types of a gear shift is expressed as first speed→second speed power-on upshift, second speed→first speed power-on downshift, or the like.

In consideration thereof, the first embodiment adopts a method of executing a gear shift of the automatic transmission 18 using a gear shift model determined in advance for determining control operation amounts that achieve gear shift target values in place of the method using a control map described above. A gear shift target value is a target value of an element (for example, a gear shift time, a drive force, and the like) which determines a variation mode that is desirably achieved during a gear shift. A control operation amount is a demanded value of an element (an engine torque, a clutch torque, or the like) which is operated with respect to a control object.

Gear shift control of the automatic transmission 18 using a gear shift model will be described in detail below. A motion equation during a gear shift of the automatic transmission 18 is represented by Expressions (1) and (2) below. Expressions (1) and (2) are derived from a motion equation of each of the rotating elements coupled to each other which constitute the automatic transmission 18 and a relational expression of a planetary gear device that constitutes the automatic transmission 18. The motion equation of each of the rotating elements is a motion equation that defines a torque expressed by a product of inertia at each rotating element and a rotation speed time variation rate using torques that act on three members (a sun gear, a carrier, and a ring gear) of the planetary gear device and a member that is involved in each rotating element among members on both sides of an engaging device. In addition, the relational expression of a planetary gear device is a relational expression that respectively defines a relationship of torque and a relationship of a rotation speed time variation rate among the three members of the planetary gear device using a gear ratio (=the number of teeth on the sun gear/the number of teeth on the ring gear) of the planetary gear device.

In Expressions (1) and (2), $d\omega t/dt$ denotes a time differential or, in other words, a time variation rate of the turbine rotation speed $\omega t$ (in other words, the transmission input rotation speed $\omega i$) and represents an angular acceleration of the input shaft 16 (hereinafter, an input shaft angular acceleration) as a velocity variation of a rotating member on the side of the input shaft 16 (in the drawings and the expressions, the time variation rate $d\omega t/dt$ is denoted using a dotted $\omega$; the same applies to other time variation rates in the description below), $d\omega o/dt$ denotes a time variation rate of the transmission output rotation speed $\omega o$ and represents an output shaft angular acceleration. Tt represents a turbine torque that is a torque on the input shaft 16 as a torque on a rotating member on the side of the input shaft 16 or, in other words, the transmission input torque Ti. The turbine torque Tt is synonymous with the engine torque Te (=Tt/t) if the torque ratio t of the torque converter 14 is to be considered. To denotes a transmission output torque that is a torque on the output shaft 20 as a torque on a rotating member on the side of the output shaft 20. Tcapl denotes an engaging-side clutch torque which becomes a high gear stage-side clutch torque during an upshift and a low gear stage-side clutch torque during a downshift. Tcdrn denotes a releasing-side clutch torque which becomes a low gear stage-side clutch torque during an upshift and a high gear stage-side clutch torque during a downshift, a1, a2, b1, b2, c1, c2, d1, and d2 respectively denote constants used when deriving Expressions (1) and (2) and are designed coefficients determined from inertia at the respective rotating elements and a gear ratio of the planetary gear device described above. For example, specific numerical values of the constants differ for each type of gear shift (for example, each gear shift pattern or each gear interstage). Therefore, even though there is one prescribed equation as the motion equation described above, motion equations corresponding to respective types of gear shifts that are considered to be different constants are used per gear shift type when performing a gear shift of the automatic transmission 18.

[Math. 1]

$$\dot{\omega}t = a1 \times Tt + b1 \times \text{Tcapl} + c1 \times \text{Tcdrn} + d1 \times \dot{\omega}o \quad (1)$$

$$To = a2 \times Tt + b2 \times \text{Tcapl} + c2 \times \text{Tcrdn} + d2 \times \dot{\omega}o \quad (2)$$

Expressions (1) and (2) are gear train motion equations of the automatic transmission 18 which formulate a relationship between a gear shift target value and a control operation amount. The gear shift target value in this case is capable of expressing respective target values of a gear shift time and a drive force and is handled on a gear train motion equation. The first embodiment uses the input shaft angular acceleration $d\omega t/dt$ as an example of an element capable of expressing a gear shaft time. In addition, the first embodiment uses the transmission output torque To as an example of an element capable of expressing a drive force. In other words, in the first embodiment, a gear shift target value is set by two values including the input shaft angular acceleration $d\omega t/dt$ and the transmission output torque To. Meanwhile, in the first embodiment, a control operation amount that establishes the gear shift target value is set by three values including the turbine torque Tt (synonymous with engine torque Te), the engaging-side clutch torque Tcapl, and the releasing-side clutch torque Tcdrn. As a result, since there are three control operation amounts as compared to the motion equation being constituted by two expressions including Expressions (1) and (2) above, the control operation amounts that establish the two gear shift target value cannot be uniquely solved. Therefore, a desired gear shift of the automatic transmission 18 that achieves the two gear shift target values cannot be executed using the gear shift model. Moreover, the output shaft angular acceleration dωo/dt is calculated from the transmission output rotation speed ωo that is a detected value of the rotation speed sensor 54.

Conceivably, the control operation amounts can be uniquely solved by adding a constraint to the motion equation represented by Expressions (1) and (2). In the gear shift control of the automatic transmission 18, controlling delivery of a torque (in other words, a gear shift progress) between a releasing-side clutch and an engaging-side clutch is considered difficult. On the other hand, when any control operation amount is set to a prescribed value in order to determine the three control operation amounts, an infinite number of the prescribed values can be adopted including a prescribed value conforming to each gear shift pattern. Regarding the prescribed value, for example, when only one of the engaging-side clutch torque Tcdrn and the engaging-side clutch torque Tcapl is set as a constraint, a tie-up or a blow-up is more likely to occur during a gear shift or controllability of control for intentionally generating a tie-up or a blow-up during a gear shift may decline. Alternatively, for example, when an engine torque variation mode is set as a constraint, there is a possibility that engine torque down control in which engine torque is temporarily varied in an inertia phase cannot be executed.

In consideration thereof, in the first embodiment, a finding has been made to set, as the constraint, a torque sharing rate of a transmission torque shared between the releasing-side clutch and the engaging-side clutch which is suitable for expressing and controlling delivery of a torque during a gear shift and which is capable of accommodating any gear shift pattern. In other words, a finding has been made to set a torque sharing rate of a transmission torque which is capable of incorporating delivery of a torque during a gear shift into the motion equation and which is capable of uniquely solving the control operation amounts as the constraint. When a total transmission torque which must be shared by the releasing-side clutch and the engaging-side clutch during a gear shift of the automatic transmission 18 is replaced with, for example, a torque on the input shaft 16 (an input shaft total transmission torque), the torque sharing rate is a ratio of the transmission torque that is respectively shared by both engaging devices with respect to the input shaft total transmission torque. In the first embodiment, if a torque sharing rate of an engaging-side clutch is denoted by "xapl" and a torque sharing rate of a releasing-side clutch is denoted by "xdrn", then the respective torque sharing rates are defined as Expressions (3) and (4) below using a torque sharing rate x (for example, 0≤x≤1) which varies in a time series so as to reflect a delivery of a torque during a gear shift, $$xapl = x \quad (3)$$

$$xdrn = 1 - x \quad (4)$$

A relational expression between the engaging-side clutch torque Tcapl and the releasing-side clutch torque Tcdrn can be defined using "x" (=xapl) and "1−x" (=xdrn) based on "Tcapl" and "Tcdrn" replaced with torques on the input shaft 16 and on Expressions (3) and (4) above. In addition, from Expressions (1) and (2) above and the relational expression between "Tcapl" and "Tcdrn", a relational expression for calculating the turbine torque Tt, the engaging-side clutch torque Tcapl, and the releasing-side clutch torque Tcdrn which are control operation amounts is derived. The turbine torque Tt (synonymous with engine torque Te) is represented by a relational expression using "x" (=xapl), "1−x" (=xdrn), the input shaft angular acceleration dωt/dt, the transmission output torque To, and the like. In a similar manner, the engaging-side clutch torque Tcapl is represented by a relational expression using "x" (=xapl), the input shaft angular acceleration dωt/dt, the transmission output torque To, and the like. In a similar manner, the releasing-side clutch torque Tcdrn is represented by a relational expression using "1−x" (=xdrn), the input shaft angular acceleration dωt/dt, the transmission output torque To, and the like. In other words, the gear shift model according to the first embodiment calculates the control operation amounts based on the gear shift target values using the motion equation (Expressions (1) and (2) above) of the automatic transmission 18 which include the gear shift target values and the control operation amounts and relationships (Expressions (3) and (4) above) which represent the torque sharing rate.

As shown, in the first embodiment, by adding a constraint set using a torque sharing rate x to the Expressions (1) and (2) above, a gear shift of the automatic transmission 18 is executed using a gear shift model. Therefore, even if there are three control operation amounts with respect to two gear shift target values, the three control operation amounts can be appropriately determined using the gear shift model. Even though there is one prescribed model as the gear shift model, as described above, since a gear train motion equation considered to be a different constant is used for each gear shift type (for example, a gear shift pattern or a gear interstage), a gear shift model corresponding to each gear shift type is to be used for a gear shift of the automatic transmission 18.

In the gear shift control of the automatic transmission 18, there are various gear shift patterns including a power-on upshift, a power-off upshift, a power-on downshift, and a power-off downshift. Therefore, a torque sharing rate is desirably set in accordance with each gear shift pattern. For example, in the first embodiment, in order to appropriately promote progress of a gear shift in accordance with a gear shift pattern, a timing at which the torque sharing rate is varied is modified based on a gear shift pattern (in other words, a timing at which a torque is delivered between the releasing-side clutch and the engaging-side clutch is modified based on a gear shift pattern). Hereinafter, settings of a torque sharing rate in accordance with respective gear shift patterns will be described in detail.

With a power-on upshift or a power-off downshift, a direction in which the turbine rotation speed ωt (in other words, the transmission input rotation speed ωi) is caused to vary by the engine torque Te (a positive torque during power-on or a negative torque during power-off (an engine friction torque)) and a direction of variation of the turbine rotation speed ωt accompanying a gear shift (a direction advanced by the gear shift) differ from each other. In other words, with a power-on upshift or a power-off downshift, progress of a gear shift cannot be promoted spontaneously by the engine torque Te. Therefore, since progress of a gear shift cannot be promoted by simply reducing an absolute value of the releasing-side clutch torque Tcdrn (by simply directing the releasing-side clutch torque towards release) without changing the torque sharing rate, it is necessary to have the engaging-side clutch cause the turbine rotation speed ωt to vary in a variation direction accompanying a gear shift. In consideration thereof, when the gear shift pattern is a power-on upshift or a power-off downshift, as shown in FIGS. 3A and 3D, a timing at which the torque sharing rate is varied is set to before a start of an inertia phase (in other words, a delivery of a torque between the releasing-side clutch and the engaging-side clutch is executed before the start of an inertia phase) to ensure that a gear shift proceeds appropriately.

On the other hand, with a power-off upshift or a power-on downshift, the turbine rotation speed ωt is caused to vary in a variation direction accompanying a gear shift due to the engine torque Te. In other words, with a power-off upshift or a power-on downshift, progress of a gear shift can be promoted spontaneously by the engine torque Te. Therefore, since progress of a gear shift can be promoted by simply reducing an absolute value of the releasing-side clutch torque Tcdrn without changing the torque sharing rate, there is no need to have the engaging-side clutch cause the turbine rotation speed ωt to vary in a variation direction accompanying a gear shift. With a power-off upshift or a power-on downshift, attempting to promote progress of a gear shift by the engaging-side clutch may have the opposite effect of possibly increasing inertia torque and aggravating a gear shift shock. In consideration thereof, when the gear shift pattern is a power-off upshift or a power-on downshift, as shown in FIGS. 3C and 3B, a timing at which the torque sharing rate is varied is set at an end of an inertia phase to ensure that a gear shift proceeds appropriately.

In other words, in the case of a power-off upshift or a power-on downshift, in order to achieve a smooth gear shift in which gear shift shock is suppressed, progress of a gear shift is promoted by simply releasing the releasing-side clutch in accordance with the engine torque Te. Subsequently, by executing a delivery of a torque between the releasing-side clutch and the engaging-side clutch so as to coincide with the end of an inertia phase, the turbine rotation speed ωt is conformed to a synchronous rotation after the gear shift by the engaging-side clutch. In this case, an end of an inertia phase refers to a time point at which the turbine rotation speed ωt has approximately approached a synchronous rotation after the gear shift such as when an inertia phase has approximately ended. In other words, an end of an inertia phase refers to a time point near the end of an inertia phase at which even if the engaging-side clutch is not directed toward engagement, an inertia phase is started and further advanced by the engine torque Te and the release of the releasing-side clutch, and the engaging-side clutch need only be controlled toward engagement only when the turbine rotation speed ωt is synchronized with a rotation speed after the gear shift. Moreover, when an inertia phase can be advanced and ended by the engine torque Te and the release of the releasing-side clutch, the end of the inertia phase may be considered to be after the inertia phase.

More specifically, in FIG. 2, the gear shift control unit 74 determines whether or not a gear shift of the automatic transmission 18 is being performed based on whether or not a gear shift determined to be executed has not yet been finished.

When the gear shift control unit 74 determines that a gear shift of the automatic transmission 18 is being performed, the control operation amount calculating unit 76 calculates the control operation amounts based on the gear shift target values using the gear shift model described above. Specifically, the control operation amount calculating unit 76 includes a torque sharing rate calculating unit 78 and a gear shift target value calculating unit 80.

The torque sharing rate calculating unit 78 calculates the torque sharing rate x based on a lapsed time from a variation start time (or a previous calculation time) from, for example, a relationship (a gear shift progress map) in which a mode (for example, an incline) that causes the torque sharing rate x to vary is determined in advance. In addition, from Expressions (3) and (4) above, the torque sharing rate calculating unit 78 calculates a torque sharing rate xapl of the engaging-side clutch and a torque sharing rate xdrn of the releasing-side clutch based on the calculated torque sharing rate x. The gear shift progress map is determined in advance for, for example, each gear shift type (gear shift pattern or gear interstage). In addition, an initial value of the torque sharing rate x is set to "0".

The gear shift target value calculating unit 80 calculates a target value of the input shaft angular acceleration dωt/dt in an inertia phase based on a lapsed time from an inertia phase start time (or a previous calculation time) from, for example, a relationship (an input shaft angular acceleration variation map) in which a mode that causes the input shaft angular acceleration dωt/dt to vary is determined in advance so that a variation of the turbine rotation speed ωt (=transmission input rotation speed ωi) during an inertia phase becomes a prescribed variation that satisfies both suppression of a gear shift shock and a gear shift time. In addition, for example, when not in an inertia phase, the gear shift target value calculating unit 80 calculates a target value of the input shaft angular acceleration dωt/dt based on a variation of the turbine rotation speed ωt (=transmission input rotation speed ωi). Furthermore, the gear shift target value calculating unit 80 calculates a target value of the transmission output torque To based on the demanded drive force Fdem calculated by the engine output control unit 72 and a lapsed time from a gear shift control start time (or a previous calculation time) from, for example, a relationship (a transmission output torque variation map) in which a mode that causes the transmission output torque To to vary is determined in advance. Moreover, the input shaft angular acceleration variation map and the transmission output torque variation map are determined in advance for, for example, each gear shift type (gear shift pattern or gear interstage).

The control operation amount calculating unit 76 calculates respective demanded values of the turbine torque Tt (synonymous with the engine torque Te), the engaging-side clutch torque Tcapl, and the releasing-side clutch torque Tcdrn as control operation amounts based on the torque sharing rates (x, xapl, and xdrn) of the engaging devices calculated by the torque sharing rate calculating unit 78 and the respective gear shift target values (respective target values of dωt/dt and To) calculated by the gear shift target value calculating unit 80 from relational expressions for calculating the control operation amounts.

The engine output control unit 72 outputs an engine output control command signal Se so that a demanded value of the turbine torque Tt (synonymous with the engine torque Te) calculated by the control operation amount calculating unit 76 is obtained. The gear shift control unit 74 outputs to the hydraulic control circuit 28 a hydraulic pressure command signal Sp for obtaining respective demanded values of the engaging-side clutch torque Tcapl and the releasing-side clutch torque Tcdrn calculated by the control operation amount calculating unit 76 so that a determined gear stage of the automatic transmission 18 is achieved.

During a gear shift transition of the automatic transmission 18, there may be cases where a torque capacity is generated on another engaging device that differs from the engaging devices that form gear stages before and after a gear shift in order to suppress heat absorption amount of engaging devices (the engaging-side clutch and the releasing-side clutch) which are involved in a gear shift. In this case, there are at least four control operation amounts including the turbine torque Tt, the engaging-side clutch torque Tcapl, the releasing-side clutch torque Tcdrn, and a torque capacity of the other engaging device (hereinafter, referred to as the other clutch torque). This means that there are at least four control operation amounts with respect to two gear shift target values and the gear train motion equation cannot be uniquely solved using Expressions (1) to (4) described earlier. The other engaging device refers to an engaging device that is not involved in the formation of gear stages before and after the gear shift among the engaging devices which form gear stages that differ from the gear stages before and after the gear shift. Specific examples of the other engaging device include, during a gear shift between, for example, the second speed gear stage and the fifth speed gear stage, an engaging device which differs from engaging devices (the clutch C1 and the brake B1) that form the second speed gear stage and engaging devices (the clutch C1 and the clutch C2) that form the fifth speed gear stage and which is an engaging device (the brake B2) that is not involved in the formation of the second speed gear stage or the fifth speed gear stage among the engaging devices (the clutch C1 and the brake B2) that form the third speed gear stage.

A mode for executing a gear shift of the automatic transmission 18 using a gear shift model when generating another clutch torque during the gear shift of the automatic transmission 18 will be described in detail below. A motion equation during a gear shift of the automatic transmission 18 when there is one other engaging device is represented by Expressions (5) and (6) below. Expressions (5) and (6) are derived in a similar manner to Expressions (1) and (2) above. In Expressions (5) and (6), Tc1 denotes a torque capacity of an engaging device which forms a gear stage after the gear shift and which is engaged during the gear shift. Tc2 denotes another clutch torque. Tc3 notes a torque capacity of an engaging device which forms a gear stage before the gear shift and which is released during the gear shift. In this case, a gear train motion equation is solved by classifying the other engaging device into any of an engaging-side clutch and a releasing-side clutch. In other words, the gear train motion equation is solved by including the other clutch torque in any of an engaging-side clutch torque Tcapl and a releasing-side clutch torque Tcdrn. Moreover, Tc1, Tc2, and Tc3 are all converted values on a same shaft (for example, on the input shaft 16).

[Math. 2]

$$\dot{\omega}t = a1 \times Tt + b1 \times Tc1 + c1 \times Tc2 + d1 \times Tc3 + e1 \times \dot{\omega}o \qquad (5)$$

$$To = a2 \times Tt + b2 \times Tc1 + c2 \times Tc2 + d2 \times Tc3 + e2 \times \dot{\omega}o \qquad (6)$$

For example, when the other engaging device is classified into an engaging-side clutch and the other clutch torque is included in the engaging-side clutch torque Tcapl, the engaging-side clutch torque Tcapl and the releasing-side clutch torque Tcdrn are defined as Expressions (7) and (8) below.

$$Tcapl = Tc1 + Tc2 \qquad (7)$$

$$Tcdrn = Tc3 \qquad (8)$$

Furthermore, with a clutch torque on a side including the other clutch torque, torque sharing rates (m1 and m2) between engaging devices classified into the same side are defined as Expressions (9) and (10) below. As shown, with a clutch torque on a side including the other clutch torque, torque sharing rates of torque capacities of the respective included engaging devices are set. However, (m1+m2)=1 is to be satisfied.

$$Tc1 = m1 \times Tcapl \qquad (9)$$

$$Tc2 = m2 \times Tcapl \qquad (10)$$

According to the above, since the constraints of Tc1 and Tc2 have been defined, by adding the torque sharing rate x of the engaging-side clutch torque Tcapl and the releasing-side clutch torque Tcdrn as a constraint or, in other words, by applying the concepts of Expressions (1) to (4) described earlier to the Expressions (5) to (10) above, the four control operation amounts (Tt, Tc1, Tc2, and Tc3) can be calculated based on the gear shift target values described above. As shown, in the first embodiment, even if there are four control operation amounts with respect to two gear shift target values, a gear train motion equation can be uniquely solved and a gear shift of the automatic transmission 18 can be executed using a gear shift model.

A motion equation during a gear shift of the automatic transmission 18 when there are two other engaging devices is represented by Expressions (11) and (12) below. Expressions (11) and (12) are derived in a similar manner to Expressions (1) and (2) above. In Expressions (11) and (12), Tc1 denotes a torque capacity of an engaging device which forms a gear stage after the gear shift and which is engaged during the gear shift. Tc2 and Tc3 respectively denote other clutch torques which differ from one another. Tc4 notes a torque capacity of an engaging device which forms a gear stage before the gear shift and which is released during the gear shift. In this case, a gear train motion equation is solved by classifying both of the two other engaging devices into any of an engaging-side clutch and a releasing-side clutch. Moreover, Tc1, Tc2, Tc3, and Tc4 are all converted values on a same shaft (for example, on the input shaft 16).

[Math. 3]

$$\dot{\omega}t = a1 \times Tt + b1 \times Tc1 + c1 \times Tc2 + d1 \times Tc3 + e1 \times Tc4 + f1 \times \dot{\omega}o \qquad (11)$$

$$To = a2 \times Tt + b2 \times Tc1 + c2 \times Tc2 + d2 \times Tc3 + e2 \times Tc4 + f2 \times \dot{\omega}o \qquad (12)$$

For example, when the two other engaging devices are both classified into engaging-side clutches and the two other clutch torques are included in the engaging-side clutch torque Tcapl, the engaging-side clutch torque Tcapl and the releasing-side clutch torque Tcdrn are defined as Expressions (13) and (14) below.

$$Tcapl = Tc1 + Tc2 + Tc3 \qquad (13)$$

$$Tcdrn = Tc4 \qquad (14)$$

Furthermore, with a clutch torque on a side including the other clutch torques, torque sharing rates (m1, m2, and m3) between engaging devices classified into the same side are defined as Expressions (15), (16), and (17) below. However, (m1+m2+m3)=1 is to be satisfied.

$$Tc1 = m1 \times Tcapl \qquad (15)$$

$$Tc2 m2 \times Tcapl \qquad (16)$$

$$Tc3 = m3 \times Tcapl \qquad (17)$$

According to the above, since the constraints of Tc1, Tc2, and Tc3 have been defined, by applying the concepts of Expressions (1) to (4) described earlier to the Expressions (11) to (17) above, the five control operation amounts (Tt, Tc1, Tc2, Tc3, and Tc4) can be calculated based on the gear shift target values described above.

When there are two other engaging devices, for example, one of the two other engaging devices can be classified into an engaging-side clutch and the other engaging device can be classified into a releasing-side clutch, and the two other clutch torques can be respectively included in the engaging-side clutch torque Tcapl and the releasing-side clutch torque Tcdrn. In such a case, the engaging-side clutch torque Tcapl and the releasing-side clutch torque Tcdrn are defined as Expressions (18) and (19) below.

$$Tcapl = Tc1 + Tc2 \quad (18)$$

$$Tcdrn = Tc3 + Tc4 \quad (19)$$

Furthermore, with the respective clutch torques on a side including the other clutch torques, torque sharing rates (m1 and m2) and (n1 and n2) between engaging devices classified into the same sides are defined as Expressions (20), (21), (22), and (23) below. However, (m1+m2)=1 and (n1+n2)=1 are to be satisfied.

$$Tc1 = m1 \times Tcapl \quad (20)$$

$$Tc2 = m2 \times Tcapl \quad (21)$$

$$Tc3 = n1 \times Tcdrn \quad (22)$$

$$Tc4 = n2 \times Tcdrn \quad (23)$$

According to the above, since the constraint of Tc1 and Tc2 and the constraint of Tc3 and Tc4 have been defined, by applying the concepts of Expressions (1) to (4) described earlier to the Expressions (11), (12), and (18) to (23) above, the five control operation amounts (Tt, Tc1, Tc2, Tc3, and Tc4) can be calculated based on the gear shift target values described above.

Even when there are three or more other engaging devices, control operation amounts can be calculated based on the gear shift target values described above by adding constraints in a similar manner to cases where there are one or two other engaging devices.

In regards to which engaging device is to be used as the other engaging device during a gear shift of the automatic transmission 18, for example, an engaging device determined in advance for each gear shift type (for example, a gear shift pattern or a gear interstage) is to be selected by the control operation amount calculating unit 76. An engaging-side clutch is capable of generating a torque capacity in a direction in which the transmission input rotation speed ωi approaches a synchronous rotation speed after a gear shift (in other words, a direction in which progress of a gear shift is promoted). On the other hand, a releasing-side clutch is capable of generating a torque capacity in a direction in which the transmission input rotation speed ωi recedes from a synchronous rotation speed after a gear shift (in other words, a direction in which progress of a gear shift is impeded). In consideration thereof, the control operation amount calculating unit 76 determines the control operation amounts by including the other clutch torque in the engaging-side clutch torque Tcapl when the other clutch torque acts so as to promote progress of a gear shift and determines the control operation amounts by including the other clutch torque in the releasing-side clutch torque Tcdrn when the other clutch torque acts so as to impede progress of a gear shift. In doing so, with respect to a torque capacity of an engaging device on a side including a torque capacity of the other engaging device, the torque sharing rate calculating unit 78 sets a torque sharing rate between engaging devices classified into a same side to, for example, a prescribed sharing rate determined in advance.

Figure 4:
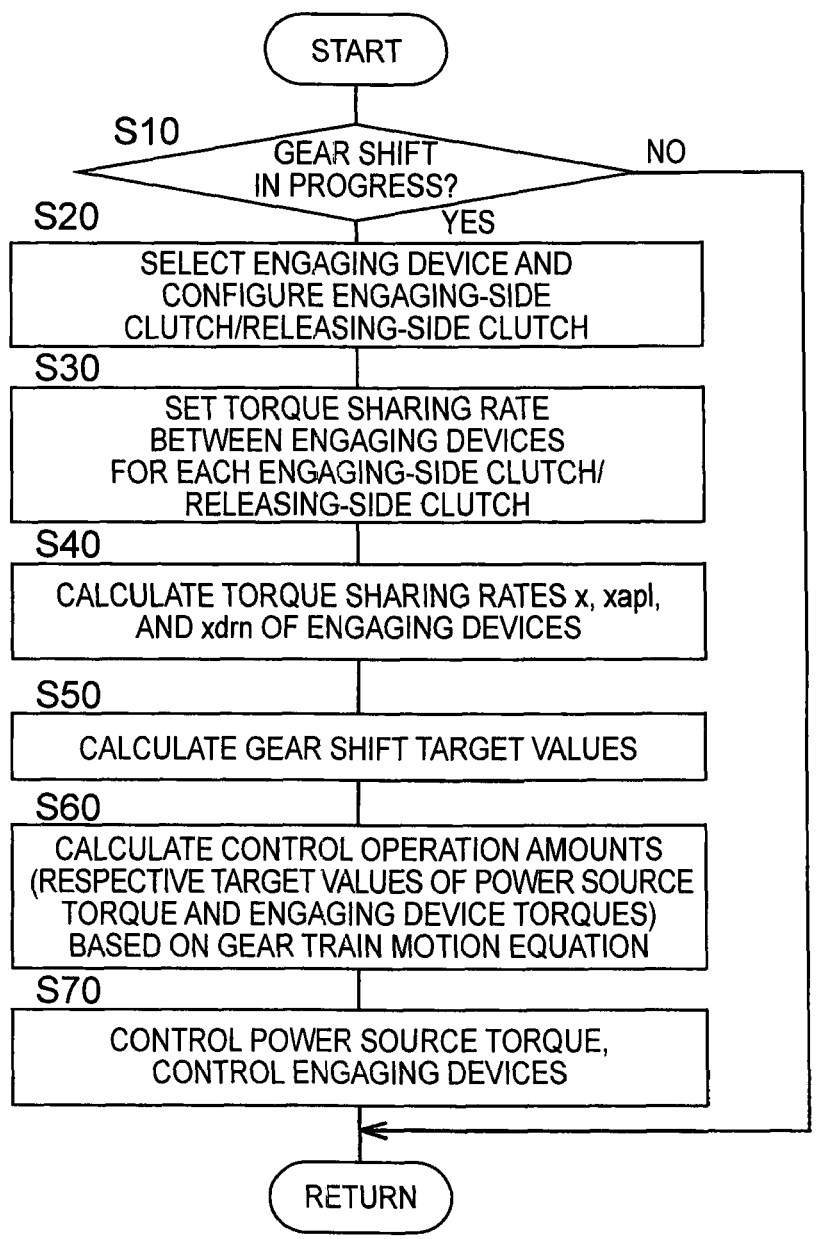
FIG. 4 is a flow chart showing a first embodiment for illustrating a substantial part of a control actuation of an electronic control unit or, in other words, a control actuation for appropriately executing a desired gear shift of an automatic transmission using a gear shift model even if another clutch torque is generated during the gear shift.
Figure 5:
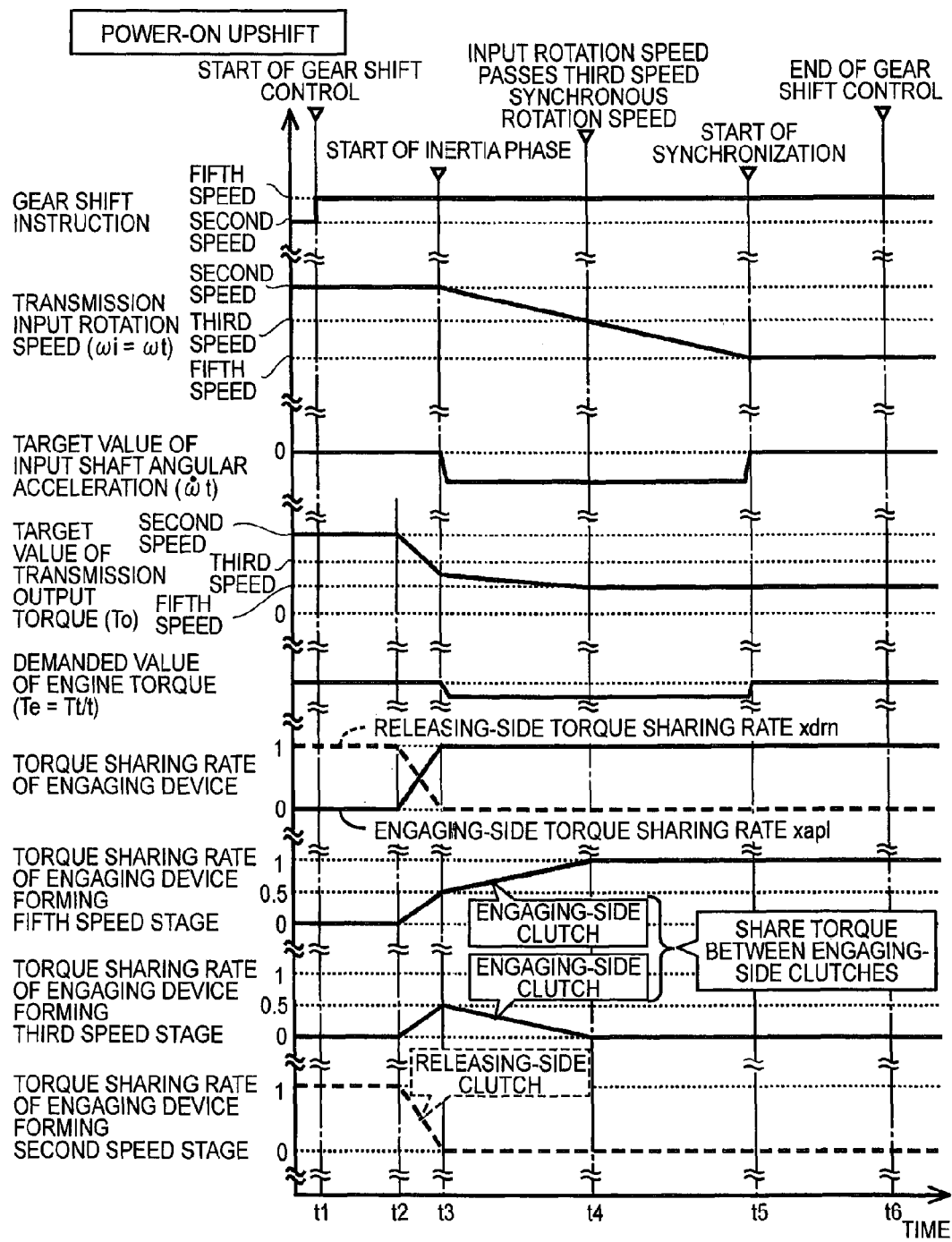
FIG. 5 is a time chart which applies when the control actuation shown in the flow chart of FIG. 4 is executed and which represents a case of a power-on upshift.
Figure 6:
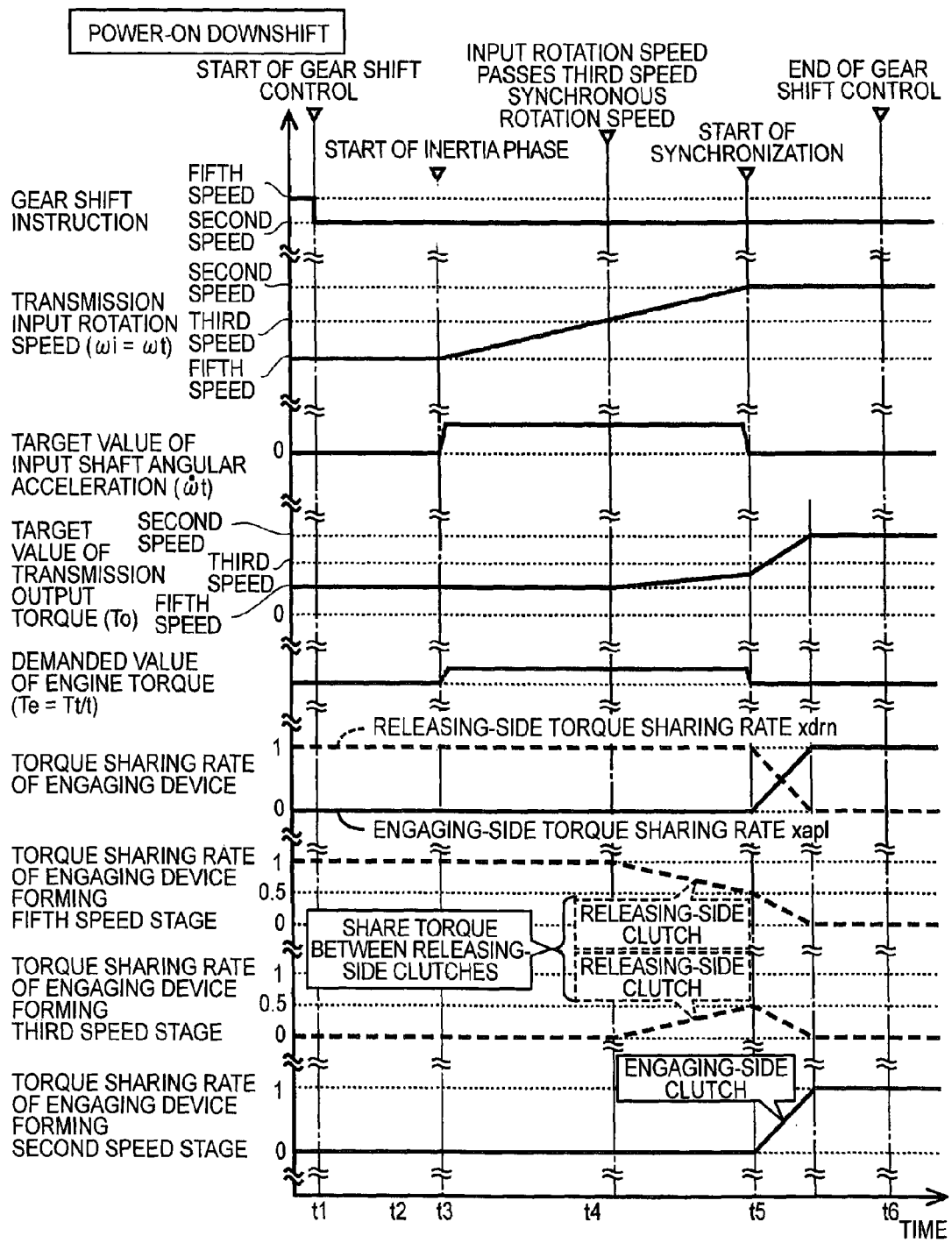
FIG. 6 is a time chart which applies when the control actuation shown in the flow chart of FIG. 4 is executed and which represents a case of a power-on downshift.

FIG. 4 is a flow chart illustrating a substantial part of a control actuation of the electronic control unit 70 or, in other words, a control actuation for appropriately executing a desired gear shift of the automatic transmission 18 using a gear shift model even if another clutch torque is generated during the gear shift, and is repetitively executed at an extremely short cycle time of, for example, around several msec to dozens of msec. FIGS. 5 and 6 are time charts which apply when the control actuation shown in the flow chart of FIG. 4 is executed, in which FIG. 5 represents a case of a power-on upshift and FIG. 6 represents a case of a power-on downshift.

In FIG. 4, first, in step (hereinafter, the term "step" will be omitted) S10 corresponding to the gear shift control unit 74, for example, a determination is made on whether or not a gear shift of the automatic transmission 18 is being performed. When the determination of S10 is negative, the routine is terminated. However, when the determination of S10 is positive (from time point t1 to time point t6 in FIGS. 5 and 6), in S20 corresponding to the control operation amount calculating unit 76, for example, an engaging device determined in advance for each gear shift type is selected as the other engaging device. In addition, based on how the other clutch torque acts on progress of a gear shift, a determination is made regarding whether the other clutch torque is to be included in the engaging-side clutch torque Tcapl or the releasing-side clutch torque Tcdrn. Next, in S30 corresponding to the torque sharing rate calculating unit 78, for example, a torque sharing rate between the engaging devices is set to a prescribed sharing rate determined in advance for each engaging device on a side including the other engaging device. Subsequently, in S40 corresponding to the torque sharing rate calculating unit 78, for example, torque sharing rates (x, xapl, and xdrn) of the engaging devices are calculated using the gear shift progress map. Next, in S50 corresponding to the gear shift target value calculating unit 80, respective gear shift target values (respective target values of the input shaft angular acceleration dωt/dt and the transmission output torque To) are calculated. Subsequently, in S60 corresponding to the control operation amount calculating unit 76, from the relational expressions for calculating the control operation amounts, the control operation amounts (respective demanded values of the engine torque Te, the engaging-side clutch torque Tcapl, the releasing-side clutch torque Tcdrn, and the other clutch torque) are calculated based on the torque sharing rates of the respective engaging devices calculated in S30 and S40 and the respective gear shift target values calculated in S50. Next, in S70 corresponding to the engine output control unit 72 and the gear shift control unit 74, the engine output control command signal Se and the hydraulic pressure command signal Sp are outputted so that the respective control operation amounts calculated in S60 are obtained and the engine 12, the releasing-side clutch, the engaging-side clutch, and other engaging devices are controlled.

In FIG. 5, for example, respective demanded values that achieve the respective target values are determined using a gear shift model and gear shift control is started (time point t1). Since the first embodiment shown in FIG. 5 represents a power-on upshift being performed, in order to appropriately promote progress of a gear shift, timings at which a torque sharing rate xapl of the engaging-side clutch and the torque sharing rate xdrn of the releasing-side clutch are varied are set to before a start of an inertia phase (time points t2 to t3). In a 2→5 upshift, since an engaging device that forms a third speed gear stage as the other engaging device is capable of generating a torque capacity in a direction which promotes progress of a gear shift until reaching a time point (time point t4) at which the transmission input rotation speed ωi that is caused to vary toward a fifth speed synchronous rotation speed passes a third speed synchronous rotation speed, the engaging device is classified into a same engaging-side clutch as an engaging device that forms a fifth speed gear stage. Therefore, the torque sharing rate xapl of the engaging-side clutch which is varied from "0" to "1" is further shared between the engaging device that forms the fifth speed gear stage and the engaging device that forms the third speed gear stage. After the start of the inertia phase (after time point t3), the torque sharing rate between engaging devices classified into the engaging-side clutch is varied so that the torque sharing rate of the engaging device that forms the third speed gear stage is at zero until reaching a time point where the engaging device passes the third speed synchronous rotation speed while maintaining "torque sharing rate xapl of the engaging-side clutch=1" (time point t3 to time point t4).

In FIG. 6, for example, respective demanded values that achieve the respective target values are determined using a gear shift model and gear shift control is started (time point t1). Since the first embodiment shown in FIG. 6 represents a power-on downshift being performed, in order to appropriately promote progress of a gear shift, timings at which the torque sharing rate xapl of the engaging-side clutch and the torque sharing rate xdrn of the releasing-side clutch are varied are set to an end of the inertia phase at which the transmission input rotation speed ωi approximately approaches a synchronous rotation after a gear shift (time points t4 and t5). In a 5→2 downshift, since an engaging device that forms the third speed gear stage as the other engaging device is capable of generating a torque capacity in a direction which impedes progress of a gear shift after a time point (time point t3) at which the transmission input rotation speed ωi that is caused to vary toward a second speed synchronous rotation speed passes a third speed synchronous rotation speed, the engaging device is classified into a same releasing-side clutch as an engaging device that forms the fifth speed gear stage. Therefore, the torque sharing rate xdrn of the releasing-side clutch which is varied from "1" to "0" is further shared between the engaging device that forms the fifth speed gear stage and the engaging device that forms the third speed gear stage. However, a torque must also be shared by the engaging device that forms the third speed gear stage until reaching a time point where variation of the torque sharing rate xdrn of the releasing-side clutch starts. Therefore, after the time point (time point t3) at which the third speed synchronous rotation speed is passed, the torque sharing rate between engaging devices classified into the releasing-side clutch is varied so that the torque sharing rate of the engaging device that forms the third speed gear stage is at a prescribed torque sharing rate until reaching the time point where a variation of the torque sharing rate xdrn starts while maintaining "torque sharing rate xdrn of the releasing-side clutch=1" (time point t3 to time point t4).

As described above, according to the first embodiment, since the torque sharing rate x is set as a constraint in consideration of the fact that the motion equation represented by Expressions (1) and (2) cannot be solved unless some kind of constraint is set, the first embodiment is suitable for controlling delivery of a torque between engaging devices that is considered difficult in gear shift control and the motion equation can be solved. From another perspective, since the torque sharing rate x expressing delivery of a torque is set as a constraint, any gear shift pattern can be accommodated by a prescribed gear shift model. Specifically, by setting the torque sharing rate x that is suitable for controlling gear shift progress as a constraint, an occurrence of a tip-up or a blow-up can be suppressed or, conversely, controllability of control for intentionally generating a tie-up or a blow-up can be improved. In addition, engine torque down control can be appropriately executed. As shown, according to the first embodiment, even if there are three control operation amounts with respect to two gear shift target values, the three control operation amounts can be suitably determined using a gear shift model and a desired gear shift of the automatic transmission 18 that achieves the two gear shift target values can be executed.

Furthermore, according to the first embodiment, when at least four control operation amounts must be determined in order to achieve two gear shift target values, since another engaging device is further classified into any of an engaging-side clutch and a releasing-side clutch depending on how another clutch torque acts on progress of the gear shift, in addition to achieving torque sharing in accordance with torque sharing rates (x, xapl, and xdrn) between the engaging-side clutch and the releasing-side clutch, torque sharing among a plurality of engaging devices classified into a same side can be arbitrarily set. As a result, the respective control operation amounts can be determined. Therefore, with the invention, a desired gear shift of the automatic transmission 18 can be more appropriately executed using a gear shift model.

In addition, according to the first embodiment, with torque capacities of engaging devices on a side that includes the other clutch torque, since a torque sharing rate of a torque capacity of each included engaging device is set, torque sharing among a plurality of engaging devices classified on the same side can be appropriately achieved.

Furthermore, according to the first embodiment, since control operation amounts are calculated based on gear shift target values using a motion equation represented by Expressions (1) and (2) and relationships represented by Expressions (3) and (4), control related to the delivery of a torque that is considered difficult in gear shift control can be reflected in the motion equation described above and the three control operation amounts can be appropriately determined.

Next, a second embodiment of the invention will be described. Moreover, portions that are mutually shared among the embodiments will be denoted by same reference numerals and a description thereof will be omitted.

In the first embodiment described above, a torque sharing rate between engaging devices classified into a same side is set to a prescribed sharing rate determined in advance. In the second embodiment, in order to perform torque sharing more appropriately, the torque sharing rate calculating unit 78 sets a torque sharing rate of each clutch torque between engaging devices classified into a same side based on heat absorption amount of the engaging devices classified into a same side. Specifically, for example, the torque sharing rate calculating unit 78 calculates heat absorption amount of an engaging device based on a differential rotation speed (slip rotation speed) of the engaging device during slipping and a shared clutch torque from a prescribed relational expression. The torque sharing rate calculating unit 78 sets the torque sharing rate between engaging devices classified into a same side so that the calculated heat absorption amount of each engaging device does not exceed a prescribed permissible value determined in advance for each engaging device. In doing so, heat absorption amount may be calculated and a torque sharing rate may be set in sequence or a torque sharing rate may be set by calculating (predicting) heat absorption amount when torque is shared based on a gear shift target value or the like prior to start of torque sharing.

It is conceivable that, as long as a releasing-side clutch and an engaging-side clutch which are involved in the formation of gear stages before and after a gear shift do not become thermally disadvantageous during a gear shift transition, there is no need to generate another clutch torque to begin with. In consideration thereof, when heat absorption amount of an engaging-side clutch (in other words, an engaging-side clutch involved in the formation of gear stages before and after a gear shift) during a gear shift does not exceed a prescribed permissible value determined in advance, the control operation amount calculating unit 76 does not generate a torque capacity on another engaging device whose torque capacity acts so as to promote progress of a gear shift (in other words, the control operation amount calculating unit 76 does not generate another clutch torque that acts so as to promote progress of a gear shift). In addition, when heat absorption amount of a releasing-side clutch (in other words, a releasing-side clutch involved in the formation of gear stages before and after a gear shift) during a gear shift does not exceed a prescribed permissible value determined in advance, the control operation amount calculating unit 76 does not generate a torque capacity on another engaging device whose torque capacity acts so as to impede progress of a gear shift (in other words, the control operation amount calculating unit 76 does not generate another clutch torque that acts so as to impede progress of a gear shift).

Specifically, the control operation amount calculating unit 76 calculates (predicts), in advance, respective heat absorption amount during a gear shift (during a gear shift in a case where another clutch torque is not generated) of a releasing-side clutch and an engaging-side clutch which are involved in the formation of gear stages before and after a gear shift based on a gear shift target value or the like. The control operation amount calculating unit 76 determines whether or not the calculated heat absorption amount of each engaging device exceeds a prescribed permissible value determined in advance for each engaging device. When the control operation amount calculating unit 76 determines that the calculated heat absorption amount exceeds the prescribed permissible value, the control operation amount calculating unit 76 selects another engaging device for sharing a transmission torque of the engaging device whose heat absorption amount had exceeded the prescribed permissible value. When the control operation amount calculating unit 76 determines that the calculated heat absorption amount does not exceed the prescribed permissible value, the control operation amount calculating unit 76 does not perform torque sharing to engaging devices other than the releasing-side clutch and the engaging-side clutch.

Figure 7:
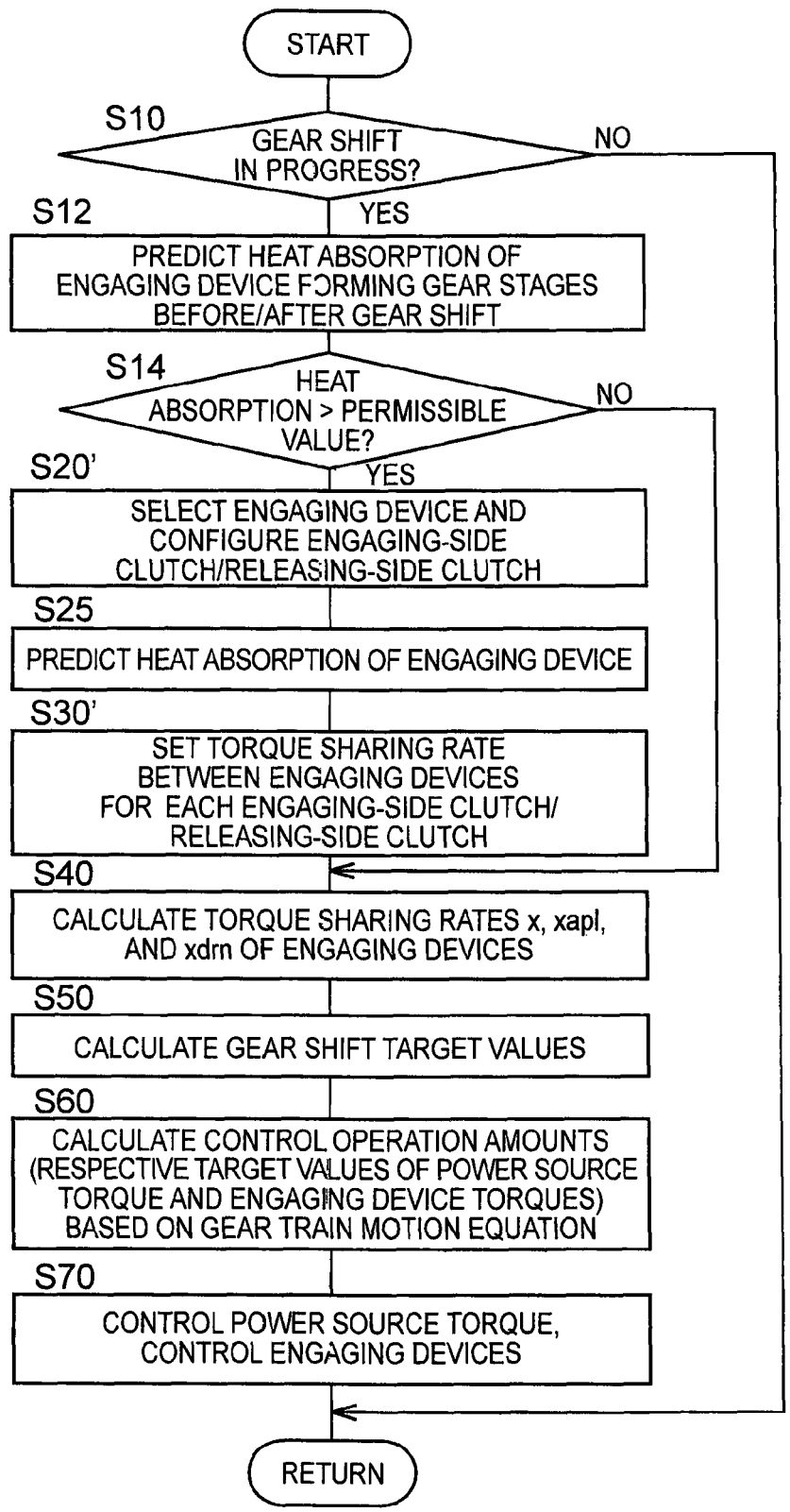
FIG. 7 is a flow chart showing a second embodiment for illustrating a substantial part of a control actuation of an electronic control unit or, in other words, a control actuation for more appropriately executing a desired gear shift of an automatic transmission using a gear shift model even if another clutch torque is generated during the gear shift.

FIG. 7 is a flow chart illustrating a substantial part of a control actuation of the electronic control unit 70 or, in other words, a control actuation for even more appropriately executing a desired gear shift of the automatic transmission 18 using a gear shift model even if another clutch torque is generated during the gear shift, and is repetitively executed at an extremely short cycle time of, for example, around several msec to dozens of msec. FIG. 7 represents the second embodiment corresponding to FIG. 4 according to the first embodiment described above. The following description will focus on differences from FIG. 4.

In FIG. 7, when the determination of S10 is negative, the routine is terminated. However, when the determination of S10 is positive, in S12 corresponding to the control operation amount calculating unit 76, respective heat absorption amount during a gear shift of a releasing-side clutch and an engaging-side clutch which are involved in the formation of gear stages before and after a gear shift are predicted. Next, in S14 corresponding to the control operation amount calculating unit 76, a determination is made on whether or not the heat absorption amount of each engaging device calculated in S12 exceeds each prescribed permissible value. When the determination of S14 is positive, in S20' corresponding to the control operation amount calculating unit 76, for example, an engaging device for sharing a transmission torque of the engaging device whose heat absorption amount had exceeded the prescribed permissible value is selected as another engaging device. In addition, the other engaging device is classified into a same side as the engaging device whose heat absorption amount had exceeded the prescribed permissible value. Next, in S25 corresponding to the torque sharing rate calculating unit 78, for example, heat absorption amount of each engaging device classified into the same side in S20' is predicted. Subsequently, in S30' corresponding to the torque sharing rate calculating unit 78, for example, a torque sharing rate between the engaging devices is set in accordance with the heat absorption amount of each engaging device calculated in S25 for each engaging device on the side including the other engaging device. When the determination of S14 is positive or after S30', S40 to S70 described earlier are executed.

As described above, according to the second embodiment, in addition to obtaining similar operational effects as the first embodiment described earlier, since a torque sharing rate of a torque capacity of each engaging device classified into a same side is set based on heat absorption amount of the engaging device, torque sharing in accordance with respective heat absorption amount is appropriately achieved among a plurality of engaging devices classified into a same side. As a result, heat absorption amount can be set to or below a permissible value for each of the plurality of engaging devices classified on the same side.

In addition, according to the second embodiment, when heat absorption amount of the engaging-side clutch during a gear shift does not exceed a prescribed permissible value, another clutch torque that acts so as to promote progress of the gear shift is not generated, and when heat absorption amount of the releasing-side clutch during a gear shift does not exceed a prescribed permissible value, another clutch torque that acts so as to impede progress of the gear shift is not generated. Accordingly, since unnecessary torque delivery of the engaging devices can be reduced, generation of a gear shift shock can be suppressed.

Next, a third embodiment of the invention will be described. In the second embodiment described above, another clutch torque is not generated as long as a releasing-side clutch and an engaging-side clutch which are involved in the formation of a gear stage before and after a gear shift do not become thermally disadvantageous during a gear shift transition. In doing so, whether or not another clutch torque is to be generated is determined based on the heat absorption amount of each engaging device. However, if a transmission torque during a gear shift is originally small, it is conceivable that a thermal disadvantage does not occur to begin with even if another clutch torque is not generated. In consideration thereof, in the third embodiment, during a gear shift of the automatic transmission 18 in which the turbine torque Tt (synonymous to the engine torque Te) falls below a prescribed torque determined in advance, the control operation amount calculating unit 76 does not generate a torque capacity at another engaging device (in other words, the control operation amount calculating unit 76 does not generate another clutch torque). Examples of a case where the turbine torque Tt falls below a prescribed torque includes a power-off gear shift. On the other hand, examples of a case where the turbine torque Tt equals or exceeds a prescribed torque includes a power-on gear shift. Specifically, the control operation amount calculating unit 76 determines whether or not a gear shift of the automatic transmission 18 is a power-on gear shift. When the control operation amount calculating unit 76 determines that the gear shift of the automatic transmission 18 is a power-on gear shift, the control operation amount calculating unit 76 selects another engaging device. When the control operation amount calculating unit 76 determines that the gear shift of the automatic transmission 18 is not a power-on gear shift, the control operation amount calculating unit 76 does not perform torque sharing to engaging devices other than the releasing-side clutch and the engaging-side clutch.

FIG. 8 is a flow chart illustrating a substantial part of a control actuation of the electronic control unit 70 or, in other words, a control actuation for even more appropriately executing a desired gear shift of the automatic transmission 18 using a gear shift model even if another clutch torque is generated during the gear shift, and is repetitively executed at an extremely short cycle time of, for example, around several msec to dozens of msec. FIG. 8 represents the third embodiment corresponding to FIGS. 4 and 7 according to the first and second embodiments described above. The following description will focus on differences from FIG. 4.

In FIG. 8, when the determination of S10 is negative, the routine is terminated. However, when the determination of S10 is positive, in S15 corresponding to the control operation amount calculating unit 76, a determination is made on whether or not a gear shift of the automatic transmission 18 is a power-on gear shift. When the determination of S15 is positive, S20 to S70 described above are executed. On the other hand, when the determination of S15 is negative, S40 to S70 described above are executed.

As described above, according to the third embodiment, in addition to obtaining similar operational effects as the first embodiment described earlier, since another clutch torque is not generated during a gear shift of the automatic transmission 18 in which the turbine torque Tt falls below a prescribed torque, unnecessary torque delivery of the engaging devices can be reduced and generation of a gear shift shock can be suppressed.

While embodiments of the invention have been described in detail with reference to the drawings, the invention can also be applied to other modes.

For example, while each embodiment is independently implemented in the description of the embodiments given above, the respective embodiments need not necessarily be implemented independently and may be implemented in combination with one another when appropriate.

In addition, in the embodiments described above, other engaging devices are classified into an engaging side or a releasing side depending on how other clutch torques act on progress of a gear shift. In doing so, the classification of other engaging devices into an engaging-side clutch or a releasing-side clutch may be modified based on actual values or predicted values of the transmission input rotation speed ωi or a differential rotation speed of engaging devices during a gear shift transition. Specifically, since classification is switched between the engaging side and the releasing side depending on whether or not a synchronous rotation speed has already been passed, the classification of other engaging devices may be modified during a gear shift transition. In other words, classification of other engaging devices into the engaging side or the releasing side at the beginning of a gear shift based on actual values or predicted values may also be applied during a gear shift transition in addition to the beginning of a gear shift. Accordingly, even when how another clutch torque acts on progress of a gear shift varies during a gear shift transition, torque sharing in accordance with a torque sharing rate can be appropriately achieved. In addition, by classifying other engaging devices into the engaging side or the releasing side based on a predicted value of the transmission input rotation speed ωi, for example, control that keeps a torque sharing rate of another engaging device at zero until reaching a synchronous rotation speed can be performed.

Furthermore, while the use of another engaging device when suffering a thermal disadvantage has been exemplified in the embodiments described above, this is not restrictive. For example, a mode may be adopted in which whether or not to use another engaging device is determined in advance for each gear shift type.

In addition, while an engaging device forming an intermediate gear stage (for example, a third speed gear stage) during a nonsequential gear shift such as a gear shift between second speed and fifth speed gear stages has been exemplified as another engaging device in the embodiments described above, this is not restrictive. For example, the engaging device may be an engaging device that forms the fifth speed gear stage during a gear shift between second speed and third speed gear stages. Furthermore, as described earlier, the other engaging device is not limited to only one engaging device. For example, two or more other engaging devices are simultaneously selected so that heat absorption amount falls within a permissible value range.

In addition, in the flow charts shown in FIGS. 4, 7, and 8 according to the embodiments described above, sequences in which the respective steps are executed can be appropriately modified within a permissible range such as switching the sequences in which steps S40 and S50 are executed.

Furthermore, while the output shaft 20 has been exemplified as a rotating member on the side of the output shaft 20 in the embodiments described above, this is not restrictive and the rotating member on the side of the output shaft 20 may be any rotating member on the power transmission path from the output shaft 20 to the drive wheel 26. While the input shaft 16 has been exemplified as a rotating member on the side of the input shaft 16, this is not restrictive and the rotating member on the side of the input shaft 16 may be any rotating member on the power transmission path from the engine 12 to the input shaft 16.

It is to be understood that the description provided above simply represents preferred embodiments of the invention and that the invention can be embodied in various modified or improved forms based on the knowledge of those skilled in the art.

What is claimed is:

1. A gear shift control apparatus for a vehicle, the gear shift control apparatus comprising:

a plurality of engaging devices configured to transmit rotation and torque between an input shaft that is configured to receive power from a drive power source and an output shaft that is configured to transmit the power to a drive wheel;

an electronic control unit configured, in an automatic transmission provided in the vehicle, to execute a gear shift by switching between engagement and release of the engaging devices and to execute the gear shift of the automatic transmission using a predetermined gear shift model, the predetermined gear shift model determining a control operation amount that achieves a gear shift target value, the electronic control unit being configured to set the gear shift target value using two values which are a torque on a rotating member on a side of the output shaft and a velocity variation of a rotating member on a side of the input shaft;

the electronic control unit being configured to set the control operation amount using three values which are a torque on the rotating member on the side of the input shaft, a torque capacity of an engaging-side engaging device during the gear shift, and a torque capacity of a releasing-side engaging device during the gear shift;

the electronic control unit being configured to set a torque sharing rate of a transmission torque that is shared between the engaging-side engaging device and the releasing-side engaging device during the gear shift;

the electronic control unit being configured to execute the gear shift of the automatic transmission using the gear shift model; and the electronic control unit being configured, when generating a torque capacity during the gear shift of the automatic transmission at another engaging device that differs from engaging devices forming gear stages before and after the gear shift, to determine the control operation amount by including the torque capacity of the other engaging device in a torque capacity of the engaging-side engaging device in a case where the torque capacity of the other engaging device acts so as to promote progress of the gear shift, the electronic control unit being configured to determine the control operation amount by including the torque capacity of the other engaging device in the torque capacity of the releasing-side engaging device in a case where the torque capacity of the other engaging device acts so as to impede progress of the gear shift.

2. The gear shift control apparatus according to claim 1, wherein the electronic control unit is configured to set a torque sharing rate of a torque capacity of each engaging device included in devices on a side including the other engaging device.

3. The gear shift control apparatus according to claim 2, wherein the electronic control unit is configured to set a torque sharing rate of a torque capacity of each of the engaging devices based on heat absorption amount by the engaging devices.

4. The gear shift control apparatus according to claim 1, wherein
the electronic control unit is configured to prevent the torque capacity from being generated at the other engaging device whose torque capacity acts so as to promote progress of the gear shift when heat absorption amount of the engaging-side engaging device does not exceed a prescribed permissible value during the gear shift, the electronic control unit being configured to prevent the torque capacity from being generated at the other engaging device whose torque capacity acts so as to impede progress of the gear shift when heat absorption amount of the releasing-side engaging device does not exceed a prescribed permissible value during the gear shift.

5. The gear shift control apparatus according to claim 1, wherein
the electronic control unit is configured to prevent the torque capacity from being generated at the other engaging device during the gear shift of the automatic transmission in which the torque on the rotating member on the side of the input shaft is smaller than a prescribed torque.

6. The gear shift control apparatus according to claim 1, wherein
the electronic control unit is configured to calculate the control operation amount based on the gear shift target value, using a motion equation of the automatic transmission including the gear shift target value and the control operation amount and using a relationship expressing the torque sharing rate in the gear shift model.

* * * * *